United States Patent
Kibel et al.

(10) Patent No.: US 7,808,888 B2
(45) Date of Patent: Oct. 5, 2010

(54) NETWORK FAULT CORRELATION IN MULTI-ROUTE CONFIGURATION SCENARIOS

(75) Inventors: Danny Kibel, Sde-Varbug (IL); Gadi Geffen, Matan (IL); Boris Roussabrov, Sunnyvale, CA (US); Adi Shemesh, Moshav Bazra (IL)

(73) Assignee: Cisco Technology, Inc., San Jose, CA (US)

(*) Notice: Subject to any disclaimer, the term of this patent is extended or adjusted under 35 U.S.C. 154(b) by 141 days.

(21) Appl. No.: 12/036,653

(22) Filed: Feb. 25, 2008

(65) Prior Publication Data
US 2009/0213725 A1 Aug. 27, 2009

(51) Int. Cl.
*G01R 31/08* (2006.01)
(52) U.S. Cl. .................. 370/216; 714/33; 714/736; 714/738; 707/4
(58) Field of Classification Search .............. 370/216, 370/225; 705/400; 714/43, 712, 33, 736, 714/738
See application file for complete search history.

(56) References Cited

U.S. PATENT DOCUMENTS

| | | | |
|---|---|---|---|
| 5,570,376 A * | 10/1996 | Kunda et al. | 714/736 |
| 5,872,911 A * | 2/1999 | Berg | 714/43 |
| 6,628,623 B1 * | 9/2003 | Noy | 370/255 |
| 7,219,287 B1 * | 5/2007 | Toutounchi et al. | 714/738 |
| 7,373,563 B2 * | 5/2008 | Noy et al. | 714/712 |
| 2007/0185854 A1 * | 8/2007 | D'Eon et al. | 707/4 |
| 2008/0010531 A1 * | 1/2008 | Hendler et al. | 714/33 |
| 2008/0189225 A1 * | 8/2008 | Herring et al. | 705/400 |

* cited by examiner

*Primary Examiner*—Albert T Chou
(74) *Attorney, Agent, or Firm*—Schwegman, Lundberg & Woessner, P.A.

(57) ABSTRACT

A method and network device are shown that include identifying at least one fault identifier to be a member of a first fault set, and identifying at least one fault identifier to be a member of a second fault set, the first fault set associated with a first path from a source node to a destination node, and the second fault set associated with a second path from the source node to the destination node. Further, the method and network device include identifying a reduced fault set by eliminating the second fault set, when the first fault set is a subset of the second fault set.

21 Claims, 12 Drawing Sheets

NETWORK FAULT CORRELATION IN MULTI-ROUTE CONFIGURATION SCENARIOS

FIELD

This application relates to an apparatus and method for determining network faults.

BACKGROUND

In certain types of networks, a number of failures (e.g., network faults) may occur during the course of the operation of a network. Network management devices may document these failures and alert a person, such as a system administrator, as to the existence of the failure or fault. The system administrator may then take action to address the fault.

BRIEF DESCRIPTION OF DRAWINGS

Embodiments are illustrated by way of example and not limitation in the figures of the accompanying drawings, in which like references indicate similar elements and in which.

DESCRIPTION OF EXAMPLE EMBODIMENTS

Figure 1:
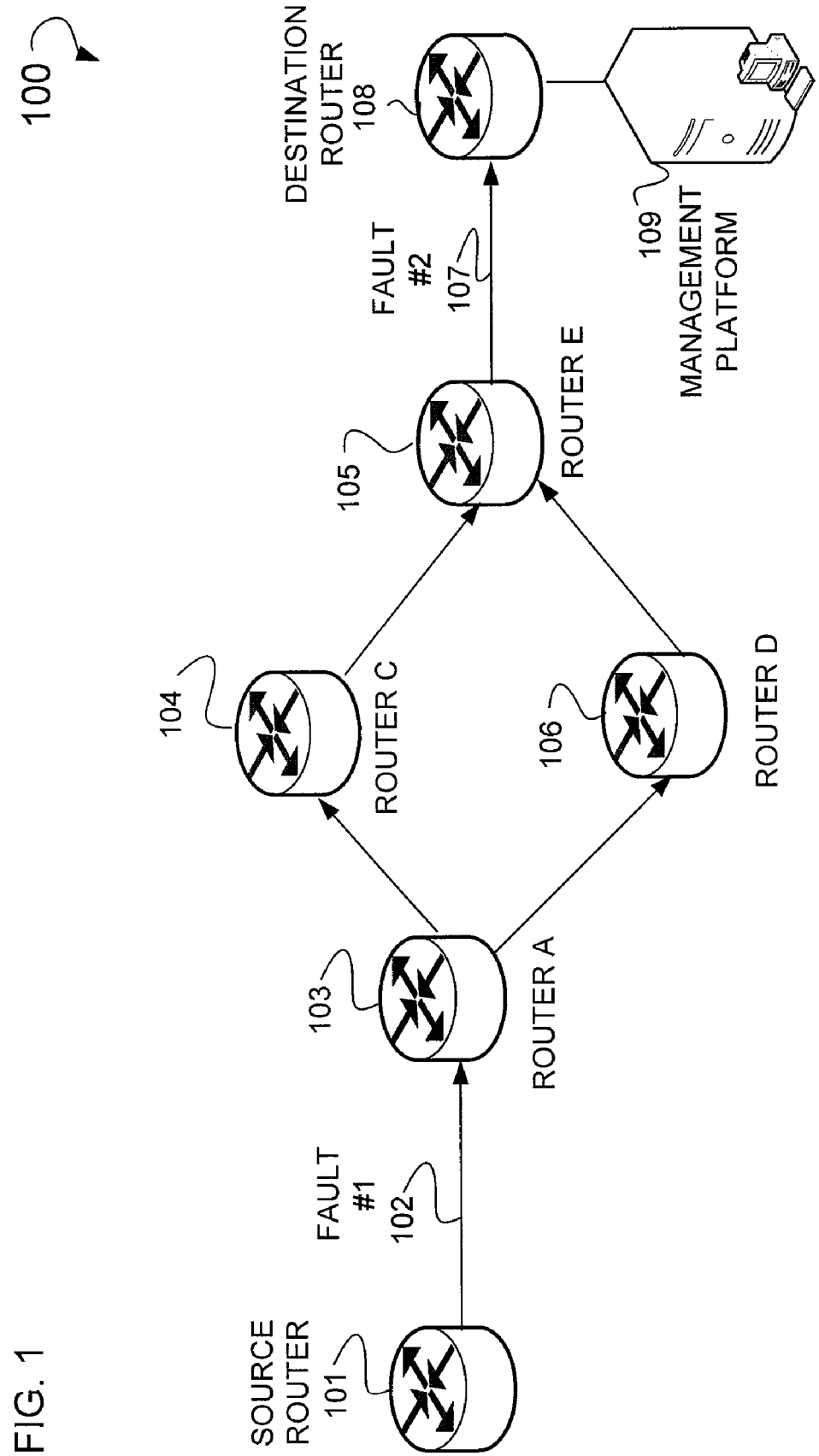
FIG. 1 is a diagram of a system, according to an example embodiment, illustrating a first network topology showing various paths between a source router and destination router, wherein some of these paths may have links that are down or otherwise inoperable.

In the following description, for purposes of explanation, numerous specific details are set forth in order to provide a thorough understanding of an embodiment of the present method and network device. It may be evident, however, to one skilled in the art, that the present method and network device may be practiced without these specific details.

Overview

In some example embodiments, a method and network device is shown that includes identifying at least one fault identifier to be a member of a first fault set, and identifying at least one fault identifier to be a member of a second fault set, the first fault set associated with a first path from a source node to a destination node, and the second fault set associated with a second path from the source node to the destination node. Further, the method and network device includes identifying a reduced fault set by eliminating the second fault set, when the first fault set is a subset of the second fault set.

Example Embodiments

In some example embodiments, a method and network device is illustrated to allow a network management platform or application to filter out network faults. The result of this filtering may be used in determining the root cause of a network failure. For example, a network management platform such as Cisco Systems, Inc.'s ACTIVE NETWORK ABSTRACTION™ (ANA) management platform may be used to implement the method and network device illustrated herein to support network fault correlation in a configuration of multiple paths from the same source to the same destination. A fault may be a card-out fault, a fault, or some other type of fault known in the art.

Some example embodiments may include, filtering a plurality of network faults in a multi-route segment. This filtering may be based on the structure of the multi-route segment. In some example embodiments, an algorithm is implemented wherein the input for the algorithm is a set(s) of network faults; each set representing all the faults which occurred on a specific path in the multi-route segment. The output may be a set(s) of faults, each set including a root cause fault. The algorithm may filter faults that entirely include other FSs, and return the remaining sets. Specifically, the algorithm outputs a reduced or, in some example cases, a minimal fault set that can be the cause of the network fault. This minimal fault set may include the root cause of a fault in a path between a source and destination router.

In one example embodiment, the algorithm is implemented based upon the following pseudo code:

Let Si = {ai1,...,aiN}, i=1...m, be a set of faults that returned on path i from the source to the destination
For each Si
{  For each Sj (j != i, Sj not eliminated)
        if Sj is entirely contained Si /* Sj entirely contained in Si means that all of the faults in Sj set appear in Si set.*/
        {
            eliminate Si;
            break;
        }
Return all Si which are not eliminated
}

As illustrated in the above pseudo code, faults are filtered which are not the root cause of a given series of faults in a network. For example, given a first and second path between the same source and destination router, if all the faults in the first path are contained in the second path, this means that the second path can be eliminated as the first path is a valid path from the same source to the same destination with potentially fewer faults.

In some example embodiments, a fault is categorized according to a fault identifier. As used herein a fault identifier may refer to an alarm, regardless of type, received by network management platform (e.g., a management platform). The alarm may denote the existence of a network fault. Further, the alarm, and the subsequent fault identifier generated from the alarm, may include one or more unique identifier values. In one example embodiment, a fault identifier may be: an Internet Protocol (IP) address of a device, a time that a fault occurred, an interface identifier, a type of fault (e.g., a fault card out fault, a Border Gateway Protocol (BGP) neighbor down fault, a device unreachable fault, or a Open Shortest Path First (OSPF) neighbor down fault), a device component failure, or some other suitable type of unique identifier value based on an alarm received or otherwise detected by the management platform. Additionally, a fault identifier may be a combination of two or more unique identifier values such that an interface name may be used in combination with an IP address, a BGP neighbor down fault may be used in combination with an IP address and time, or some other suitable combination of unique identifier values. Moreover, in an ANA based system, each node and/or link between nodes may have a unique identifier that may serve as a fault identifier.

In some example embodiments, a device unreachable fault is triggered. This fault may denote a device (e.g., a node in a network topology) that is unreachable due to a link fault (e.g., a fault). A fault identifier may be used to denote a device unreachable fault.

Some example embodiments may include, using the fault identifier to identify the location of a fault relative to another fault or network device. Further, the fault identifier, as expressed in a minimal fault set, may also be used for this purpose. For example, the fault identifier may be used to determine if a fault contained in the minimal fault set is upstream or downstream from the network device. A management platform may use this information to re-route network traffic, or to engage in other suitable activities.

In one example embodiments, the determination of a set of faults is performed through a series of path traversals from a source router to a destination router. Specifically, a path is identified from the source router to the destination router, and faults identified along this path. This process of identify paths, and faults associated with paths, may continue until all paths and faults between a source and destination router are identified. The result of this process may be an all-fault set.

FIG. 1 is a diagram of an example system 100 illustrating a first network topology including various routers and links between routers. Shown is a source router 101 that is operatively connected to a router A 103 via a link. Here this link is referenced as a fault #1 102. This router A 103 is, in turn, operatively connected to a router C 104 and a router D 106. Further, this router C 104 and router D 106 are operatively connected to a router E 105. The router E 105 is operatively connected to a destination router 108 via a link; here referenced as a fault #2 107.

Monitoring the various routers shown herein, and the various links between these routers, is a management platform 109. This management platform 109 may monitor these various routers and links to determine which links between the routers may have faults. As will be more fully shown below, this management platform 109 may utilize the method and network device shown herein to filter out various combinations of link faults (e.g., fault #1 102 and fault #2 107) to determine a minimal fault set.

In some example embodiments, alarms are generated by one or more of the routers (e.g., 101, 103, 104, 105 and/or 106) notifying the management platform 109 that certain links between routers have failed. As shown in FIG. 1, alarms are generated for fault #1 102, and fault #2 107. These various links lie on one or more paths between the source router 101 and the destination router 108. In one example embodiment, fault identifiers are generated for each alarm and assembled into an all-fault set. Then, individual FSs are extracted from the all-fault set. This extraction may be based upon paths and associated fault identifiers between the source router 101 and the destination router 108. For example, the following fault set may be identified or otherwise generated: $S_1=\{1, 2\}$. Fault sets are eliminated, that include other FSs as a subset, to generate a minimal fault set. Here, because there is only one link set of faults, the minimal fault set is $\{1, 2\}$.

Figure 2:
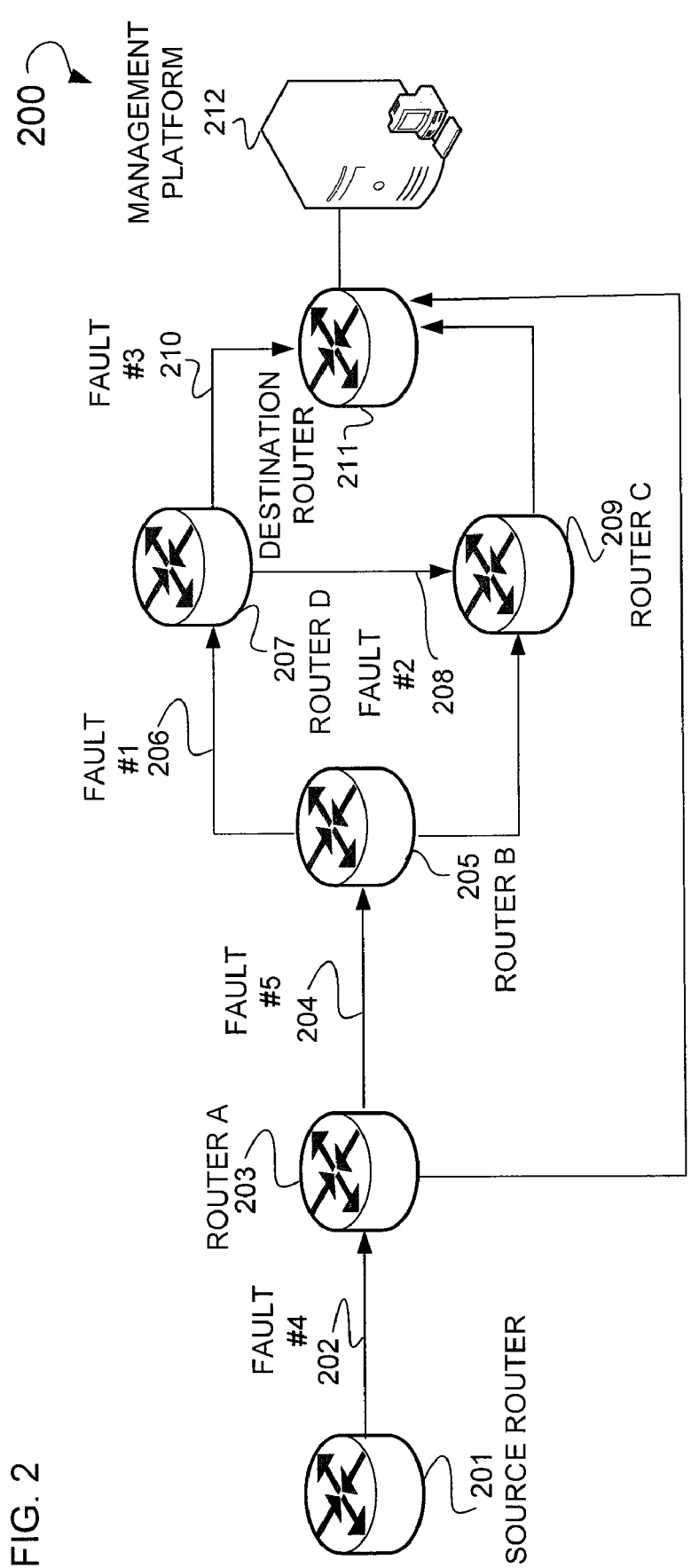
FIG. 2 is a diagram of a network, according to an example embodiment, illustrating a second network topology showing various paths between a source router and destination router, wherein some of these paths may have links that are down or otherwise inoperable.

FIG. 2 is a diagram of an example network 200, illustrating a second network topology including various routers and links between routers. Shown is a source router 201 that is operatively connected to a router A 203 via a link; here referenced as a fault #4 202. The router A 203 is, in turn, operatively connected to a router B 205 and a destination router 211.

Connecting the router A 203 to the router B 205 is a link, here referenced as a fault #5 204. This router B 205 is operatively connected to a router D 207 and router C 209. For example, router B 205 is operatively connected to router D 207 via a link, here referenced as fault #1 206. Further, router D 207 is operatively connected to router C 209 via a link referenced as a fault #2 208.

With regard to router D 207, this router D 207 is operatively connected to the destination router 211 via a link here referenced as fault #3 210. Further, router C 209 is operatively connected to the destination router 211. Monitoring these various routers, and associated links, is a management platform 212. As will be more fully illustrated below, a method and network device may be implemented to filter these various failed links to a determine a minimal fault set arising from downed links for a given path(s) between the source router 201 and the destination router 211.

In some example embodiments, alarms are generated by one or more of the routers (e.g., 201, 203, 205, 207, 209 and/or 211) notifying the management platform 212 that certain links between routers have failed. As shown in FIG. 2, alarms are generated for fault #4 202, fault #5 204, fault #1 206, fault #2 208, and fault #3 210. These various faults correspond to various links. These various links lie on one or more paths between the source router 201 and the destination router 211. In one example embodiment, a fault identifier is generated for each alarm and assembled into an all-fault set. This all-fault set may include fault identifiers for the previously referenced fault Nos. 1-5 (e.g., 202, 204, 206, 208, and 210). Then, sets based upon paths between the source router 201 and destination router 212 is extracted from the all-fault set. For example, the following FSs (e.g., Si) may be identified or otherwise generated:

$S_1=\{4, 5, 1, 3\}$
$S_2=\{4, 5\}$
$S_3=\{4, 5, 1, 2\}$
$S_4=\{4\}$

Once these FSs are generated, FSs are elimination that contains other FSs as subset. Here, for example, the following FSs are eliminated:

$S_1=\{4, 5, 1, 3\}$
$S_2=\{4, 5\}$
$S_3=\{4, 5, 1, 2\}$

These FSs are eliminated for they all include $S_4$ as a subset. The minimal fault set is $S_4=\{4\}$.

Figure 3:
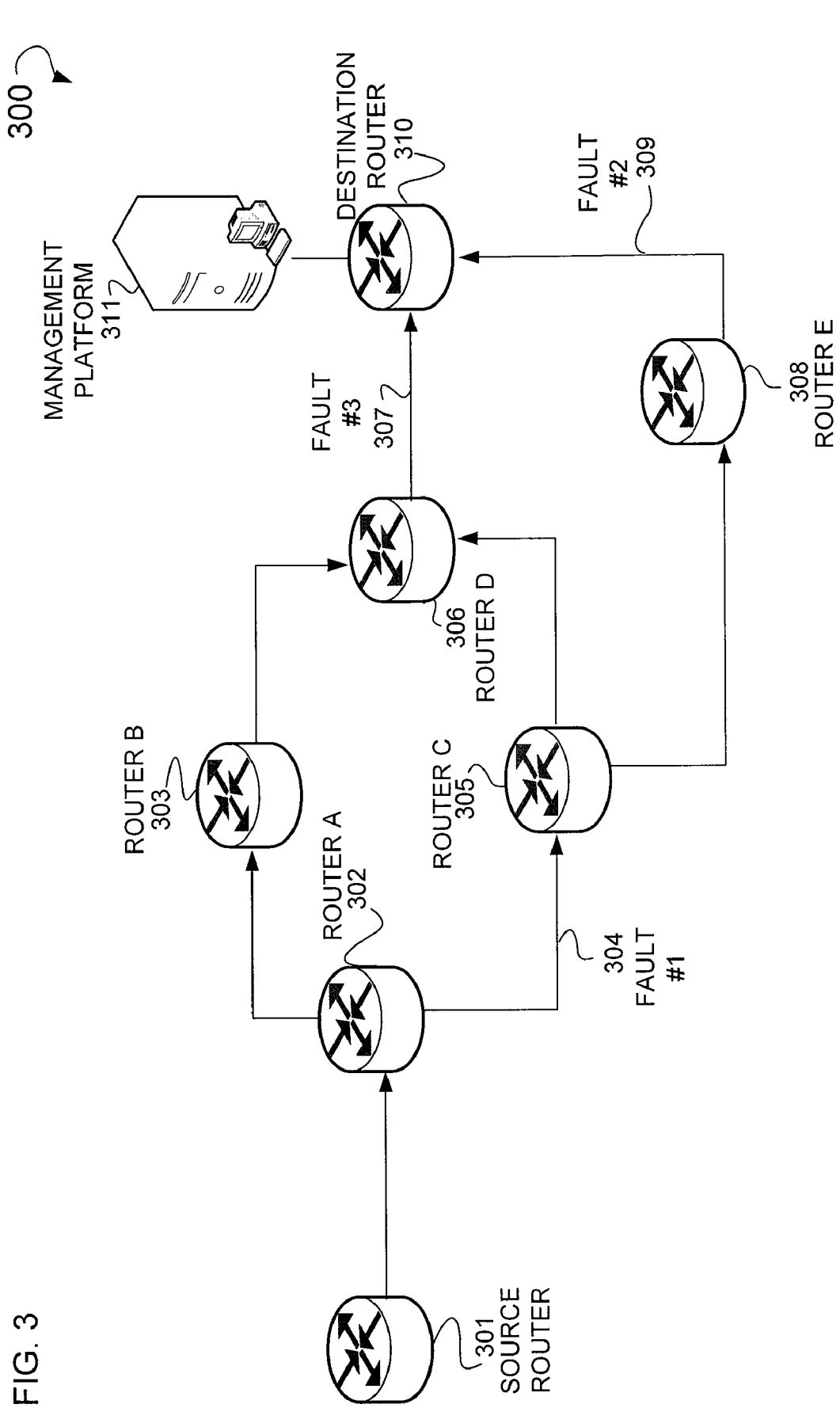
FIG. 3 is a diagram of a system, according to an example embodiment, illustrating a third network topology showing various paths between a source router and destination router, wherein some of these paths may have links that are down or otherwise inoperable.

FIG. 3 is a diagram of an example system 300, illustrating a third network topology showing various paths between a source router and destination router, wherein some of these paths may have links that are down or otherwise inoperable. Shown is a source router 301 that is operatively connected to a router A 302. This router A 302 is, in turn, operatively connected to a router B 303 and a router C 305. With regard to the link connecting the router A 302 and router C 305, a link is shown referenced as a fault #1 304. The router B 303 is, in turn, operatively connected to a router D 306. The router C 305 is, in turn, operatively connected to the router D 306 and to a router E 308. The router D 306 is operatively connected to a destination router 310 by a link referenced here as fault #3 307. The router E 308 is operatively connected to a destination router 310 via a link here referenced as fault #2 309.

As will be more fully illustrated below, a method and network device is shown that allows for a management platform 311 to monitor the various routers and links shown herein for failed links (e.g., fault #1 304, fault #2 309, and fault #3 307). Through implementing the method and network device described herein, the management platform 311 may determine which of the various paths between the source router 301 and destination router 310 include fault and which of these various paths and faults constitute a minimal fault set.

In some example embodiments, alarms are generated by one or more of the routers (e.g., 302, 306, and/or 308) notifying the management platform 311 that certain links between routers have failed. As shown in FIG. 3, alarms are generated for fault #1 304, fault #2 309, and fault #3 307. These various links lie on one or more paths between the source router 301 and the destination router 310. In one example embodiment, a fault identifier is generated for each alarm and the fault identifiers are then assembled into an all-fault set. This all-fault set may include fault identifiers for the previously referenced fault Nos. 1-3 (e.g., 304, 309, and 307). Then, sets based upon paths between the source router 301 and destination router 310 is extracted from the all-fault set. For example, the following FSs (e.g., Si) may be identified or otherwise generated:

$S_1=\{1, 3\}$
$S_2=\{1, 2\}$
$S_3=\{3\}$

Once these FSs are generated, FSs are eliminated that include other FSs as subset. Here, for example, the following fault set $S_1=\{1, 3\}$ is eliminated. This fault set is eliminated because it contains $S_3$ as a subset. A minimal fault set is generated including $\{1, 2, 3\}$.

Figure 4:
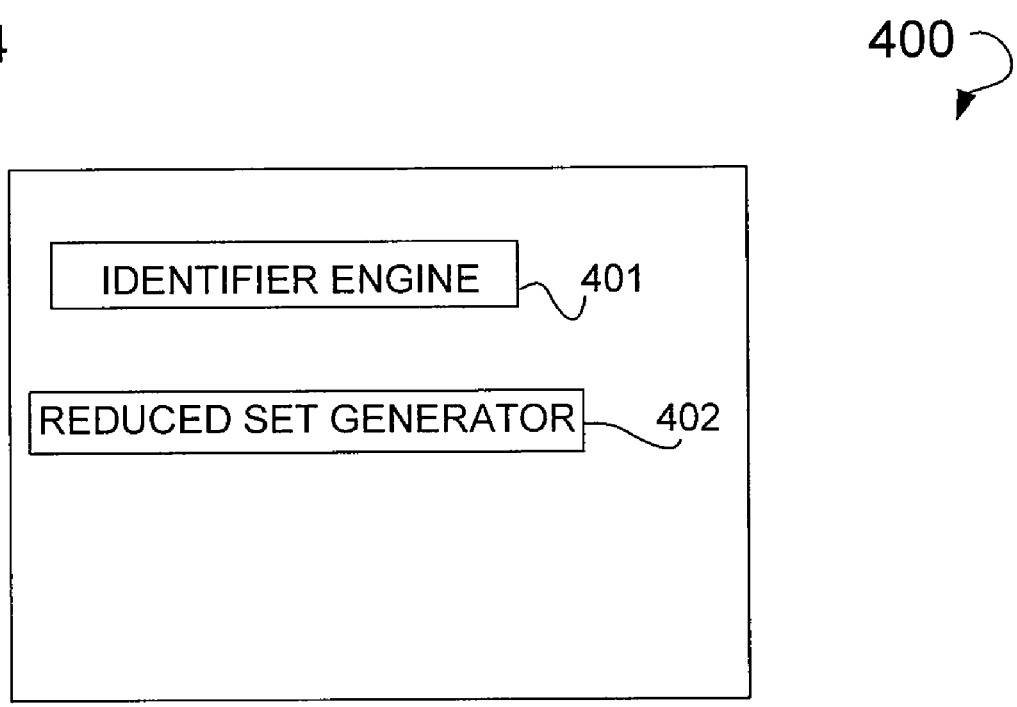
FIG. 4 is a block diagram of a system, according to an example embodiment, used to determine a minimal fault set.

FIG. 4 is a block diagram frame of an example system 400 used to determine a minimal fault set. This system 400 may be the management platform 108, 212, or 311. The various blocks shown herein may be implemented in software, firmware, or hardware. Shown is an identifier engine 401 to identify at least one fault identifier to be a member of a first fault set, and to identify at least one fault identifier to be a member of a second fault set, the first fault set associated with a first path from a source node to a destination node, and the second fault set associated with a second path from the source node to the destination node. Additionally, a reduced set generator 402 is shown to identify a reduced fault set through the elimination of the second fault set, when the first fault set is a subset of the second fault set. In some example embodiments, the reduced set generator 402 maps the member of the first fault set to the member of the second fault set to determine if the member of the first fault set is a member of the second fault set. Further, in some example cases the reduced fault set is a minimal fault set. In some example cases, the reduced set generator 402 identifies the reduced fault set through the elimination of the second fault set through the use of a set operation. The set operation may include at least one of a join operation, a set difference operation (−), a Cartesian product operation (×), a union operation (∪), or an intersection operation (∩). The reduced set generator 402 may identify a reduced fault set that is a combination of the first fault set and the second fault set, when the member of the first fault set and the member of the second fault set are distinct. Additionally, the source node and the destination node may be within a network domain where the network domain is at least one of a layer 1, or layer 2 based network including Ethernet, Frame Relay, 802.11, 802.16, or some other suitable layer 1 or layer 2 protocol. Additionally, this network domain may be a layer 3 or layer 4 network utilizing protocols including an Internet Protocol (IP), or a Data Over Cable Service Interface Specifications (DOCSIS) protocol, or some other suitable layer 3 or layer 4 protocol. In some example embodiments, the reduced set generator 402 uses at least one of a recursive method or an iterative method.

Figure 5:
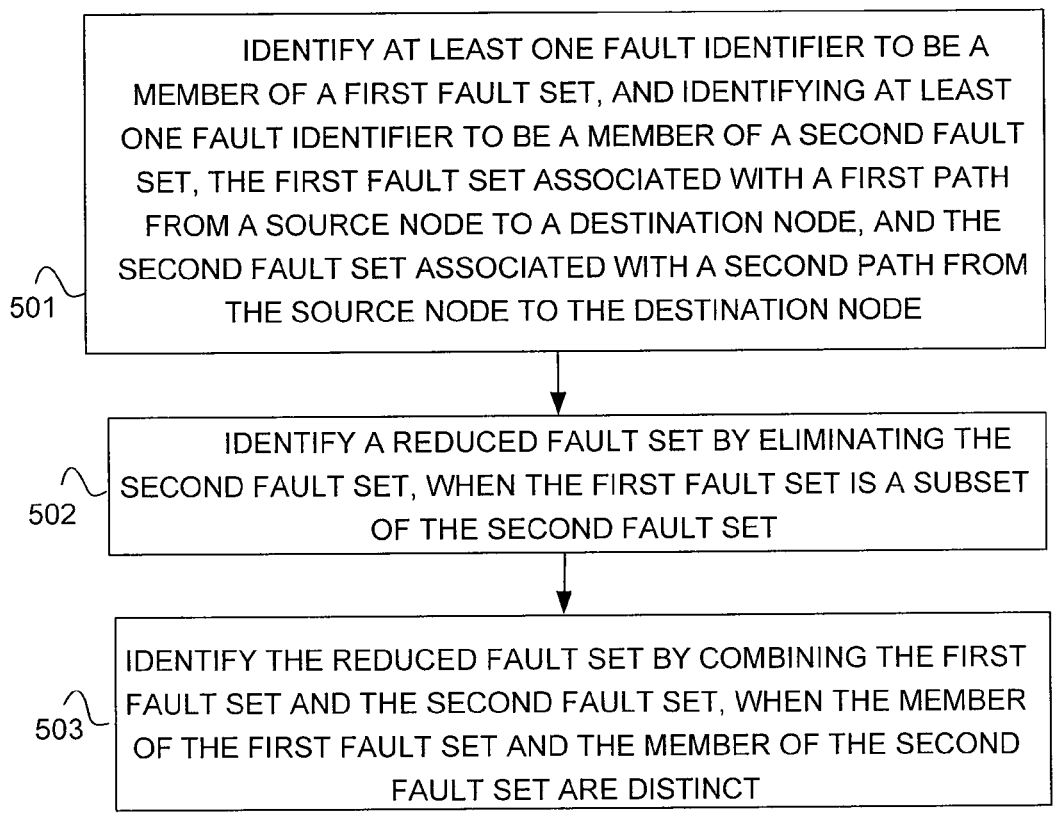
FIG. 5 is a flow chart illustrating a method, according to an example embodiment, used to determine a minimal fault set.

FIG. 5 is a flow chart illustrating an example method 500 used to generate a minimal fault set. This method 500 may be executed on the management platform 108, 212, or 311. Shown are various operations 501 through 503. In some example embodiments, an operation 501 is executed to identify at least one fault identifier to be a member of a first fault set, and identifying at least one fault identifier to be a member of a second fault set, the first fault set associated with a first path from a source node to a destination node, and the second fault set associated with a second path from the source node to the destination node. Further, an operation 502 is executed to identify a reduced fault set by eliminating the second fault set, when the first fault set is a subset of the second fault set. Additionally, the reduced fault set may include mapping the member of the first fault set to the member of the second fault set to determine if the member of the first fault set is the member of the second fault set. Moreover, the reduced fault set may be a minimal fault set. This reduced fault set may be identified by eliminating the second fault set includes utilizing a set operation to identify the reduced fault set. The set operation may be a join operation, a set difference operation, a Cartesian product operation, a union operation or an intersection operation. An operation 503 may be executed to identify the reduced fault set by combining the first fault set and the second fault set, when the member of the first fault set and the member of the second fault set are distinct. In some cases, the source node and the destination node are within a network domain. This network domain may be a network including at least one of a layer 1, or layer 2 based network. In some example embodiments, the reduced fault set is identified by eliminating the second fault set includes using at least one of a recursive method or an iterative method.

Figure 6:
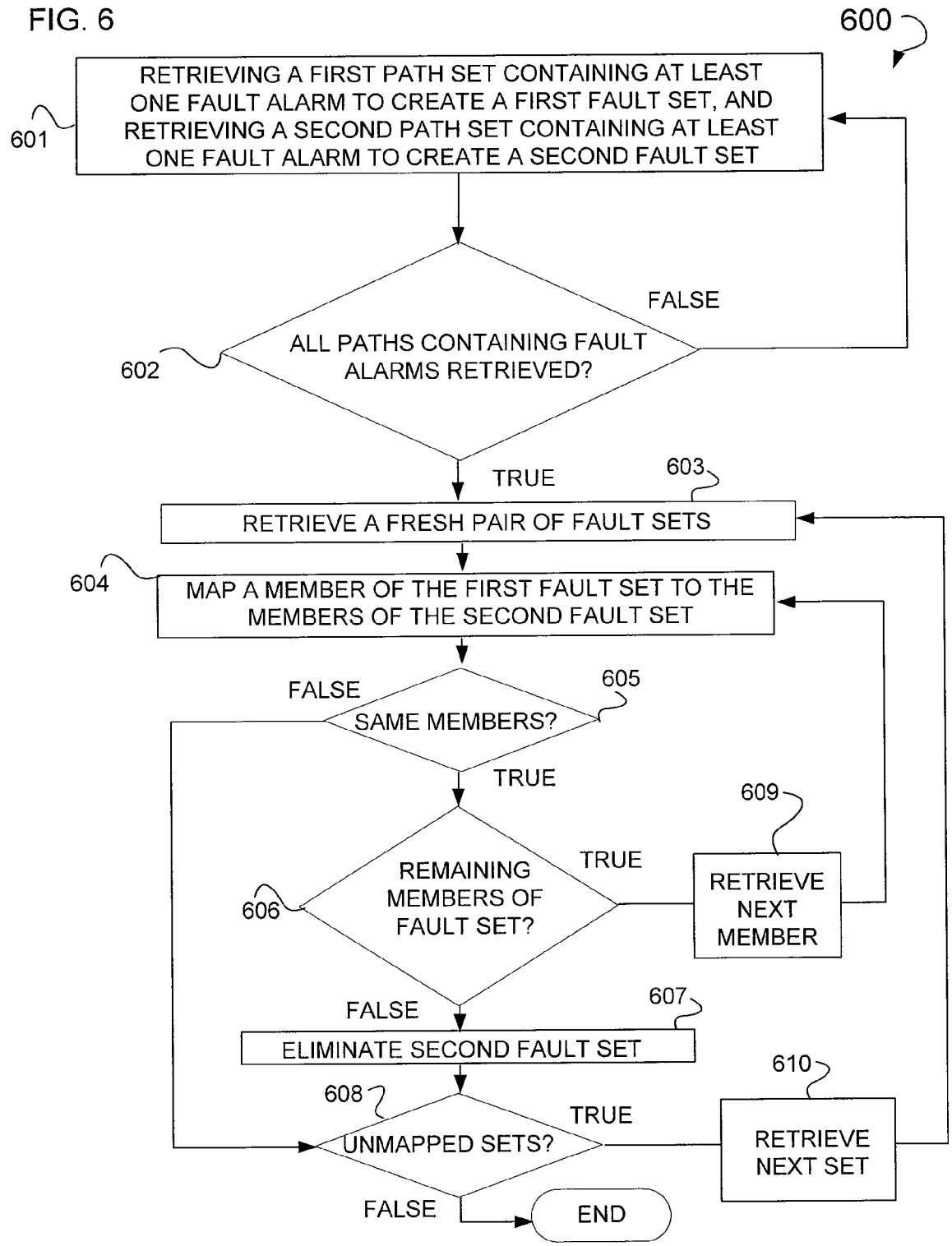
FIG. 6 is a flow chart illustrating a method, according to an example embodiment, used to determine a minimal fault set on a set-by-set basis.

FIG. 6 is a flow chart illustrating example method 600 used to determine a minimal fault set on a set-by-set basis. Shown is a plurality of operations 601-610. An operation 601 may be executed that retrieves at least a first path and a second path between a source and destination node (e.g., a source router and destination router). A decisional operation 602 is executed that determines whether all paths between the source and destination nodes including alarms have been retrieved. In cases where decisional operation 602 evaluates to "false," the operation 601 is re-executed. In cases where decisional operation 601 evaluates to "true," an operation 603 is executed. Operation 603, when executed, may retrieve a fresh pair of FSs for processing. In some example embodiments, a fresh pair of faults sets is a pair of faults sets having a different combination or permutation as compared to a previously retrieved pair of FSs. A fresh pair may include a first fault set and a second fault. For example, a fresh pair of the set including the ordered pair Fault Set 1 (FS1) and Fault Set 2 (FS2) (e.g., collectively {FS1, FS2}) may be the set including the ordered pair FS2 and FS1 (e.g., collectively {FS2, FS1 }). The total number of FSs pairs ultimately retrieved by the operation 603 may be contingent upon the number of paths between the source and destination nodes for which alarms have been generated. An operation 604 may be implemented that, when executed, maps a member of the first fault set to the members of the second fault set, on a one to one, or one to many basis.

A decisional operation 605 may be executed that determines whether or not the member of the first fault set is the same as one or more of the members of the second fault set. Cases where decisional operation 605 evaluates to "false," a further decisional operation 608 may be executed. In cases where decisional operation 605 evaluates to "true," a further decisional operation 606 may be executed that determines whether there are remaining members of the first link set. In cases where decisional operation 606 evaluates to "true," a next member operation 609 is executed and the previously referenced operation 604 is re-executed. In cases where decisional operation 606 evaluates to "false," an operation 607 is executed that eliminates the second fault set. An operation 608 may be executed that determines whether or not there is a fresh pair of faults sets. In cases where decisional operation 608 evaluates to "true," a retrieve next set operation 610 is executed, and the operation 603 is re-executed. Operations 609 and 610 may be executed on an iterative or recursive basis. In cases where decisional operation 608 evaluates to "false," any remaining sets are combined to form a minimal fault set and a termination condition executed. Collectively, operations 603-606, and 608-610 may identify at least one fault identifier to be a member of a first fault set, and they may identify one fault identifier to be a member of a second fault set. Operation 607, when executed, may identify a reduced or minimal fault set.

Figure 7:
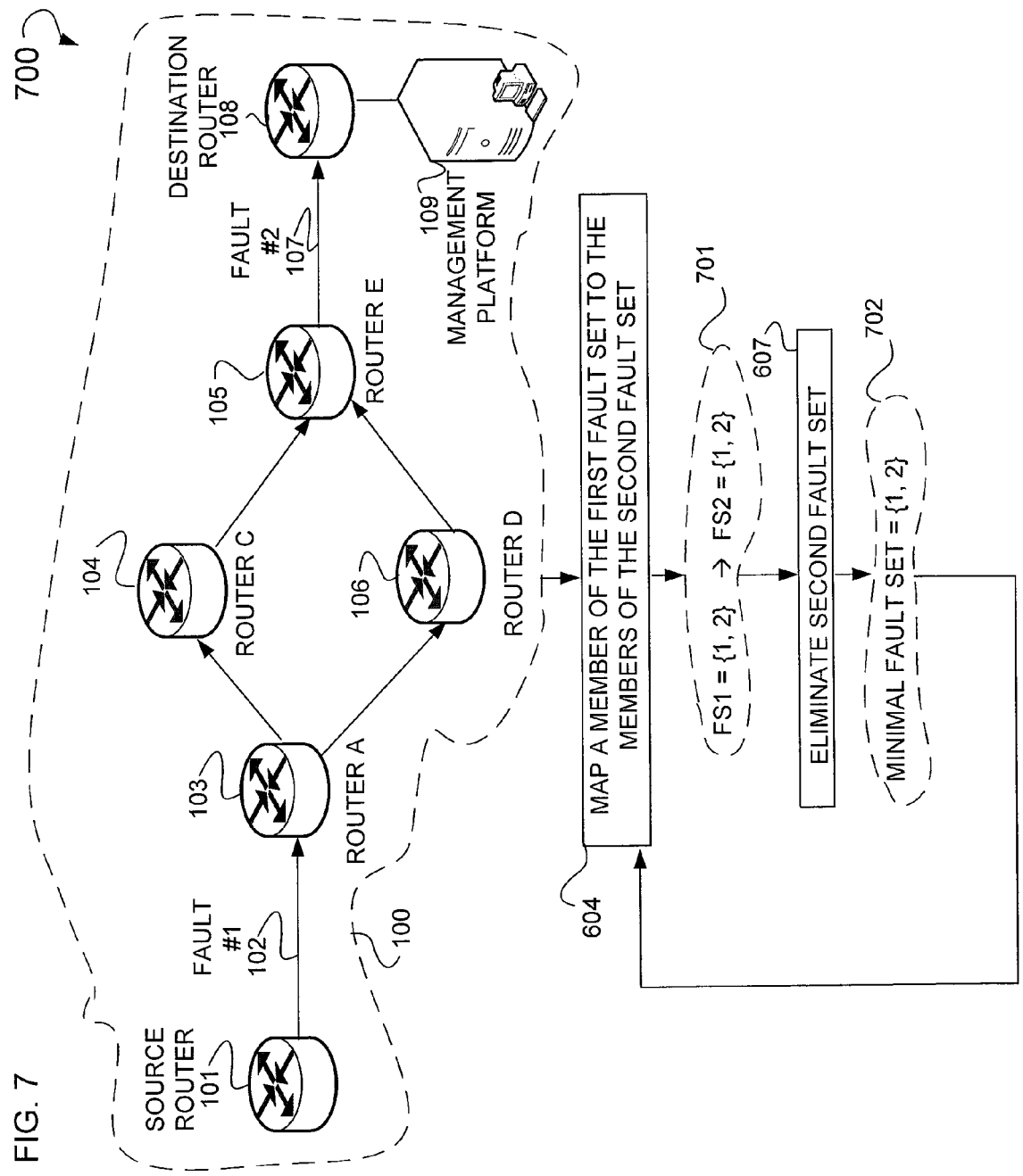
FIG. 7 is a flowchart illustrating a method, according to an example embodiment, wherein various Fault Sets (FSs) for the first network topology are shown, and a minimal fault set calculated on a set-by-set basis.

FIG. 7 is a flowchart illustrating an example method 600, wherein various FSs are shown. Shown are the system 100 and an application of the operation 604 to the various paths and associated alarms arising from these paths. As a result of the execution of operation 604, a mapping 701 is generated wherein an FS1 is mapped to a FS2. The operation 607 is then applied to the mapping 701 so as to generate a minimal fault set 702 including the set {1, 2}.

Figure 8:
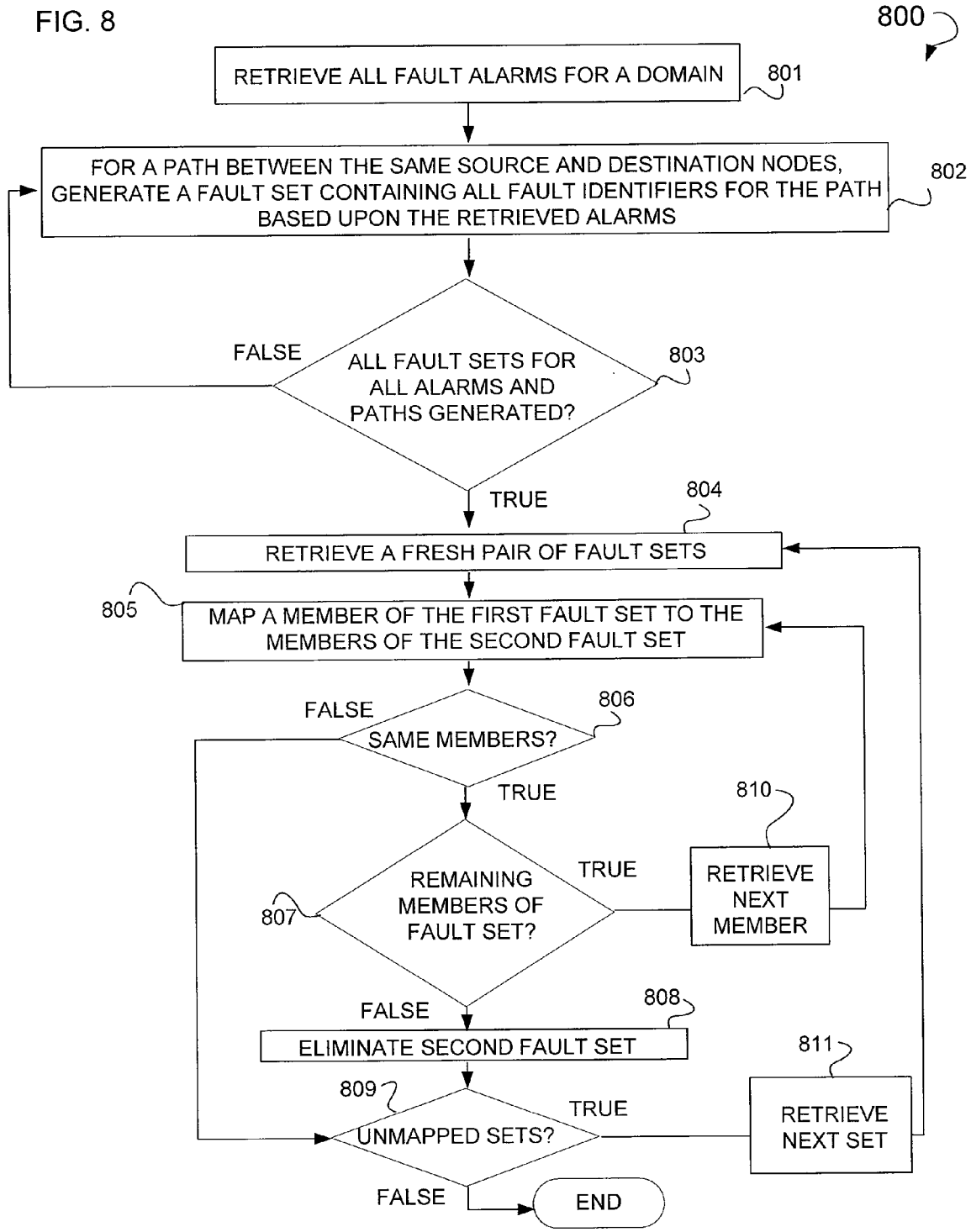
FIG. 8 is a flow chart illustrating a method, according to an example embodiment, for generating an all-fault set used to determine a minimal fault set.

FIG. 8 is a flow chart illustrating example method 800 used to determine a minimal fault set by generating an all-fault set. Shown are various operations 801 through 811. Illustrated is an operation 801 that, when executed, retrieves all alarms for a domain. This domain may be, for example, one or more of the previously shown topologies (see e.g., FIGS. 1-3), or some other suitable network topology. An operation 802 may be executed such that for any path between a source and destination node (e.g., a source router and destination router), a fault set is generated including all fault identifiers for this path based upon the retrieved alarms.

In some example embodiments, a decisional operation 803 may be executed that determines whether all-FSs for all alarms along paths have been generated. In cases where decisional operation 803 evaluates to "false," the previously shown operation 802 may be re-executed. Cases where decisional operation 803 evaluates to "true," the operation 804 may be executed so as to retrieve a fresh pair of FSs. This fresh pair may include a first fault set and a second fault.

An operation 805 may be executed that maps a member of the first fault set to the members of the second fault set. This mapping may occur where a member of the first fault set is contained in the second fault set. A decisional operation 806 may be executed that determines whether or not the member of the first fault set is the same as one or more of the members of the second fault set. Cases where decisional operation 806 evaluates to "false," a further decisional operation 809 may be executed. In cases where decisional operation 806 evaluates to "true," a further decisional operation 807 may be executed that determines whether there are remaining members of the first link set. In cases where decisional operation 807 evaluates to "true," a retrieve next member operation 810 is executed and the previously referenced operation 805 is re-executed. In cases where decisional operation 807 evaluates to "false," an operation 808 is executed that eliminates the second fault set. The decisional operation 809 may be executed to determine whether or not there is a fresh pair of faults sets. In cases where decisional operation 809 evaluates to "true," a retrieve next set operation 811 is executed and the operation 804 is re-executed. Operations 810 and 811 may be executed on an iterative or recursive basis. In cases where decisional operation 809 evaluates to "false," a termination condition is implemented. Collectively, operations 804-807, and 809-811 may identify at least one fault identifier to be a member of a first fault set, and they may identify one fault identifier to be a member of a second fault set. Operation 808, when executed, may identify a reduced or minimal fault set.

Figure 9:
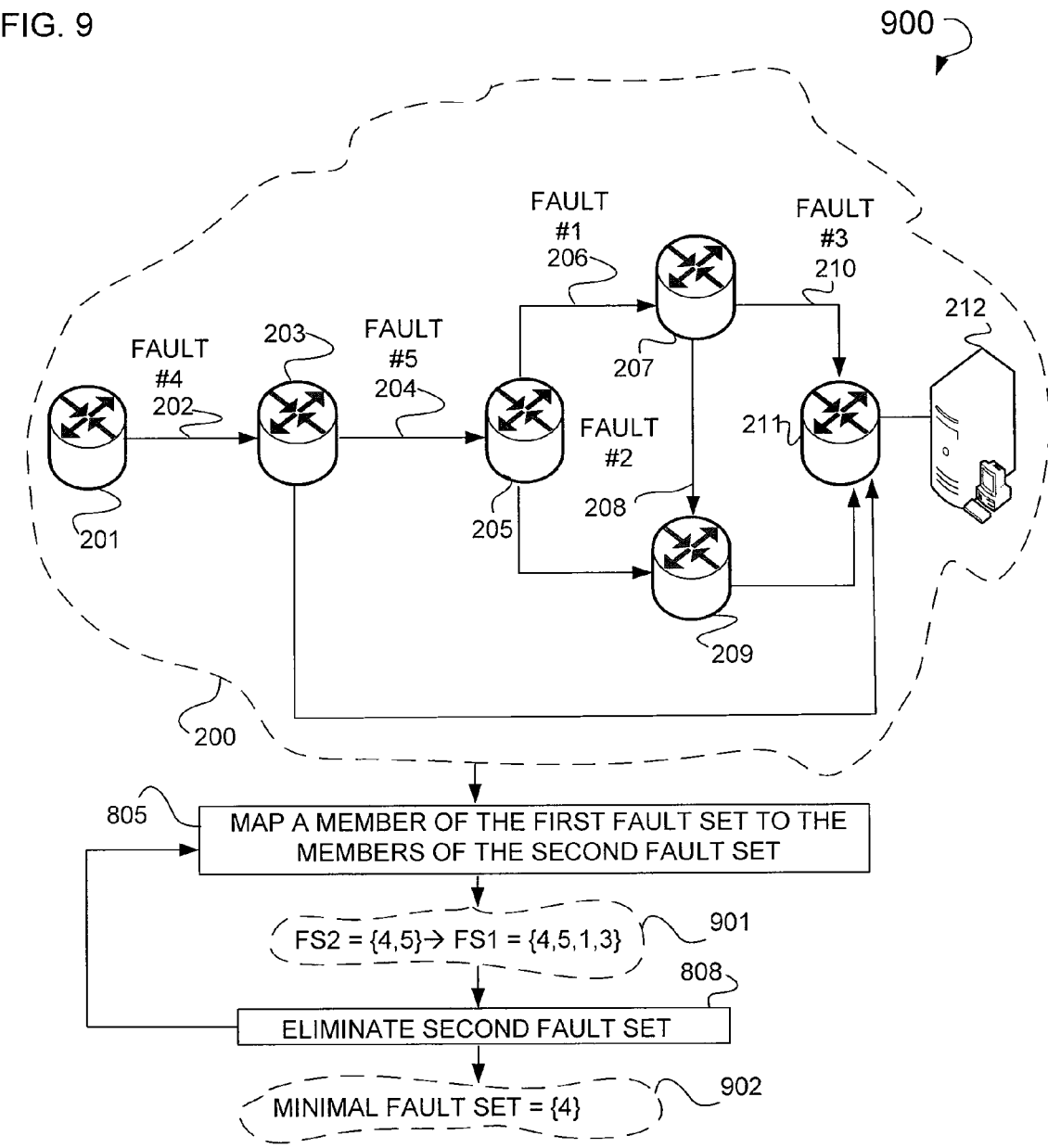
FIG. 9 is a flowchart illustrating a method, according to an example embodiment, wherein various FSs are shown for the second network topology, and a minimal fault set calculated based upon an all-fault set basis.

FIG. 9 is a flowchart illustrating an example method 900, wherein various FSs are shown. Illustrated is the previously referenced system 200. The system 200, and the various faults contained therein, is processed through the execution of the operation 805, such that a member of the first fault set is mapped to members of a second fault set. This mapping is shown via mapping 901, wherein an FS2 including the fault #4 and fault #5 is mapped to a FS1 including the faults #4, #5, #1, and #3.

As a result of this mapping, an operation 808 is executed that eliminates the second fault set, which is here fault set #1. This process of mapping and elimination may occur iteratively or recursively for the entire fault set including all the fault identifiers. The result of this process is a minimal fault set 902, which here contains fault #4.

Figure 10:
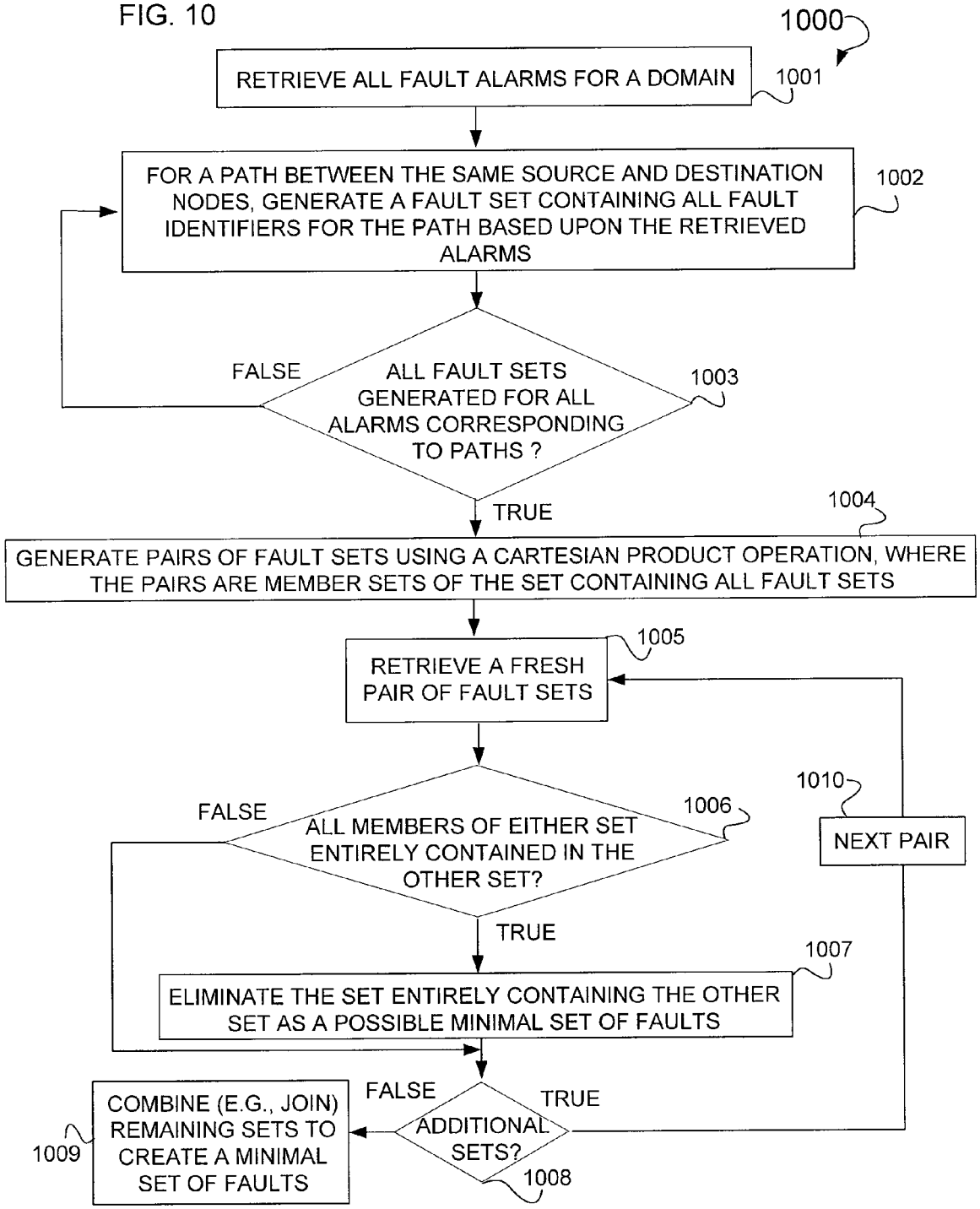
FIG. 10 is a flowchart illustrating a method, according to an example embodiment, showing the use of various set operations to determine a minimal fault set.

FIG. 10 is a flowchart illustrating an example method 1000, showing the use of set operations to generate a minimal fault set. Shown are various operations 1001 through 1010. Illustrated is an operation 1001 that, when executed, retrieves all alarms for a domain. This domain may be, for example, any of the networks shown in FIGS. 1 through 3. An operation 1002 may be executed that determines a path between a source and destination nodes (e.g., a source router and a destination router) and generates a fault set including all fault identifiers for the path based upon the retrieved alarms.

A decisional operation 1003 may be executed that determines whether or not all-FSs for all alarms and paths have been generated. In cases where a decisional operation 1003 evaluates to "false," the previously shown operation 1002 is re-executed. Cases where a decisional operation 1003 evaluates to "true," an operation 1004 is executed that generates pairs of FSs using a Cartesian product operation. As a result of the execution or implementation of this Cartesian product operation, pairs of member sets are created to generate an all-fault sets (e.g., all-FSs). In some example embodiments, some other type of set operation or combination of set operations may be used to generate these pairings. These operations may include an intersection operation, a union operation, a set difference operation, a join operation, or some other suitable set operation.

An operation 1005 may be executed to retrieve a fresh pair of FSs. This fresh pair may include a first fault set and a second fault. In some example embodiments, a decisional operation 1006 may then be executed that determines whether or not all members of either set of the pair (e.g., the first fault set and the second fault set) is entirely contained in the other set. Specifically, decisional operation 1006 determines whether one of the sets is a subset of another set. This determination may be carried out using one or more of the above referenced set operations. In cases where a decisional operation 1006 evaluates to "false," a decisional operation 1008 is executed (see discussion below). In cases where a decisional operation 1006 evaluates to "true," an operation 1007 is executed that eliminates the set that entirely contains another possible set as a possible minimal fault set. The decisional operation 1008 determines whether a fresh pair of FSs exists. In cases where decisional operation 1008 evaluates to "true," an operation 1010 is executed and the operation 1005 re-executed. Operation 1010 may be executed on an iterative or recursive basis. In cases where operation 1005 is re-executed, the retrieved pair may include one of a member of the pair from the previous iteration. In cases where decisional operation 1008 evaluates to "false," an operation 1009 is executed. Operation 1009, when executed, may combine remaining set to create a minimal fault set. Collectively, operations 1003-1006, and 1008-1010 may identify at least one fault identifier to be a member of a first fault set, and they may identify one fault identifier to be a member of a second fault set. Operation 1007, when executed, may identify a reduced or minimal fault set.

Figure 11:
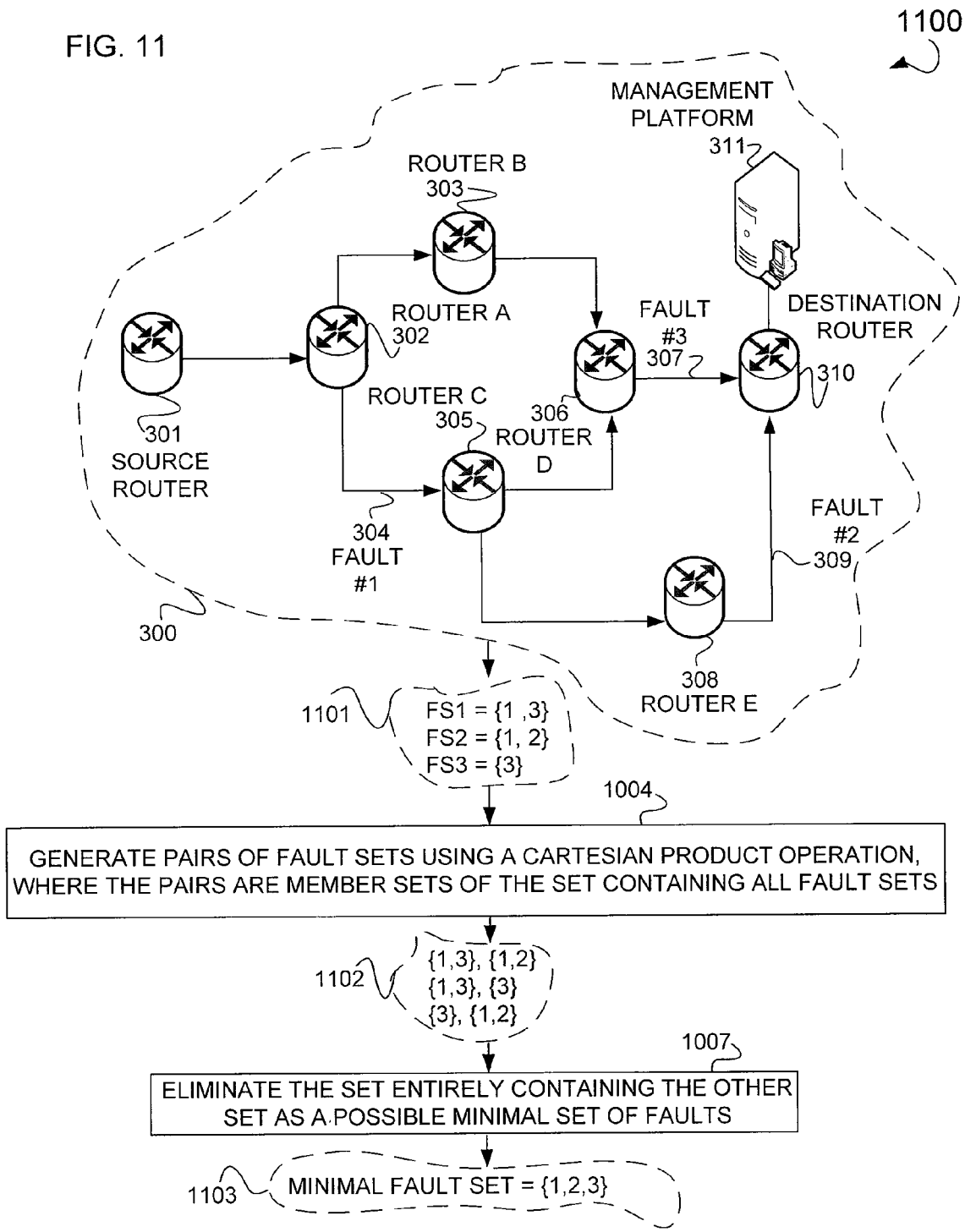
FIG. 11 is a flowchart illustrating the execution of a method, according to an example embodiment, wherein various FSs are shown for the third network topology, and a minimal fault set calculated using various set operations.

FIG. 11 is a flowchart illustrating the execution of an example method 1100, wherein a minimal fault set is determined using the previously referenced set operations. Shown is the system 300, wherein this system 300 contains a number of paths between the source router 301 and the destination router 310. Along this plurality of paths, are a number of faults, such as fault #1 304, fault #2 309 and fault #3 307. These faults are, in some example cases, placed into a fault set (e.g., an all-FSs 1101).

Contained within this all-fault set 1101 is an FS1 including the fault #1 and #3, a FS2 including the fault #1 and #2, and a FS3 including the fault #3. This all-fault set 1101 is then processed through the execution of operation 1004, wherein a pair of FSs is generated using a Cartesian product operation.

As a result of the execution of operation 1004, a set 1102 of pairs is generated reflecting a mapping of all combinations of members of the all-fault set 1101. An operation 1007 may then be executed that eliminates any set entirely including another set as a possible minimal fault set. As a result, a minimal fault set 1103 is generated including as members fault #1 304, fault #2 309 and fault #3 307.

Some example embodiments may utilize the Open Systems Interconnection Basic Reference Model (OSI) model, or Transmission Control Protocol/Internet Protocol (TCP/IP) stack model for defining the protocols used by a network to transmit data. In applying these models, a system of data transmission between a server and client, or between peer computer systems, is illustrated as a series of approximately five layers comprising: an application layer, a transport layer, a network layer, a data link layer, and a physical layer. In examples of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some examples, Internet refers to a network of interconnected computer networks. These networks may use a variety of protocols for the exchange of data, including the aforementioned TCP/IP, or some other suitable protocol. These networks may be organized within a variety of topologies (e.g., a star topology), or structures.

In some example embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

As shown herein, and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device work together to perform operations on electronic data.

In some example embodiments, the method and apparatus may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The method and apparatus can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

Figure 12:
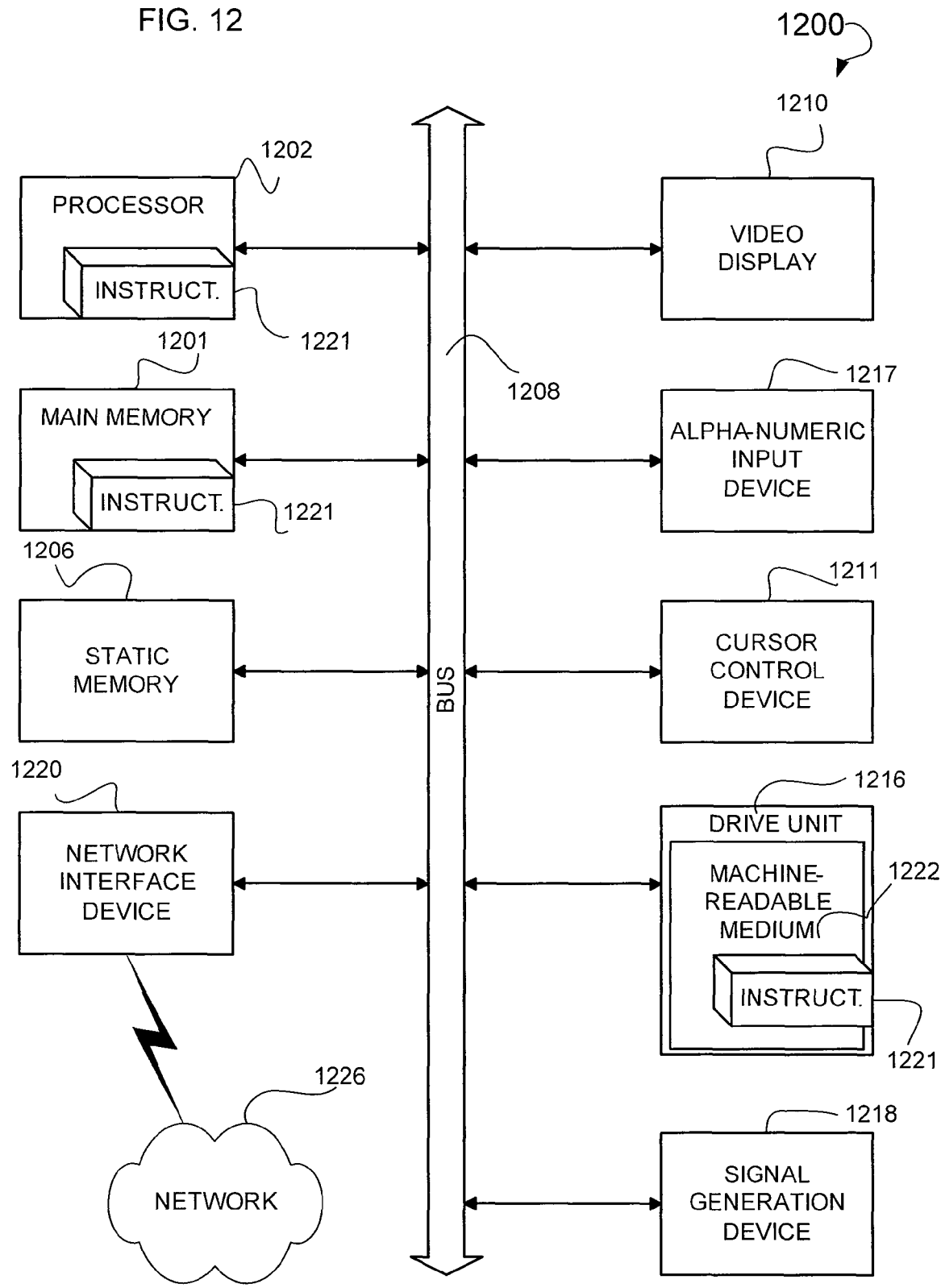
FIG. 12 shows a diagrammatic representation of machine, according to an example embodiment, in the form of a computer system.

FIG. 12 shows a diagrammatic representation of machine in the example form of a computer system 1200 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a web appliance, a network router, switch, or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a Central Processing Unit (CPU), a Graphics Processing Unit (GPU) or both), a main memory 1201 and a static memory 1206, which communicate with each other via a bus 1208. The computer system 1200 may further include a video display unit 1210 (e.g., a LCD or a CRT). The computer system 1200 also includes an alpha-numeric input device 1217 (e.g., a keyboard), a user interface (UI) cursor controller 1211 (e.g., a mouse), a disk drive unit 1216, a signal generation device 1218 (e.g., a speaker) and a network interface device (e.g., a transmitter) 1220.

The disk drive unit 1216 includes a machine-readable medium 1222 on which is stored one or more sets of instructions and data structures (e.g., software) 1221 embodying or utilized by any one or more of the methodologies or functions illustrated herein. The software may also reside, completely or at least partially, within the main memory 1201 and/or within the processor 1202 during execution thereof by the computer system 1200, the main memory 1201 and the processor 1202 also constituting machine-readable media.

The instructions 1221 may further be transmitted or received over a network 1226 via the network interface device 1220 using any one of a number of well-known transfer protocols (e.g., Hyper-Text Transfer Protocol (HTTP), Session Initiation Protocol (SIP)).

While the machine-readable medium 1222 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform any one or more of the methodologies of the present method and apparatus, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

It is to be understood that the above description is intended to be illustrative, and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the method and apparatus should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   identifying, using one or more processors, at least one fault identifier to be a member of a first fault set, and identifying at least one fault identifier to be a member of a second fault set, the first fault set associated with a first path from a source node to a destination node, and the second fault set associated with a second path from the source node to the destination node; and
   identifying a reduced fault set by eliminating the second fault set, when the first fault set is a subset of the second fault set.

2. The method of claim 1, wherein the identifying the reduced fault set includes mapping the member of the first fault set to the member of the second fault set to determine if the member of the first fault set is the member of the second fault set.

3. The method of claim 1, wherein the reduced fault set is a minimal fault set.

4. The method of claim 1, wherein identifying the reduced fault set by eliminating the second fault set includes utilizing a set operation to identify the reduced fault set.

5. The method of claim 4, wherein the set operation includes at least one of a join operation, a set difference operation, a Cartesian product operation, a union operation or an intersection operation.

6. The method of claim 1, further comprising identifying the reduced fault set by combining the first fault set and the second fault set, when the member of the first fault set and the member of the second fault set are distinct.

7. The method of claim 1, wherein the source node and the destination node are within a network domain.

8. The method of claim 7, wherein the network domain is a network including at least one of a layer 1, or layer 2 based network.

9. The method of claim 1, wherein identifying the reduced fault set by eliminating the second fault set includes using at least one of a recursive method or an iterative method.

10. A network device comprising:
    an identifier engine to identify at least one fault identifier to be a member of a first fault set, and to identify at least one fault identifier to be a member of a second fault set, the first fault set associated with a first path from a source node to a destination node, and the second fault set associated with a second path from the source node to the destination node; and a reduced set generator to identify a reduced fault set through the elimination of the second fault set, when the first fault set is a subset of the second fault set.

11. The network device of claim 10, wherein the reduced set generator maps the member of the first fault set to the member of the second fault set to determine if the member of the first fault set is a member of the second fault set.

12. The network device of claim 10, wherein the reduced fault set is a minimal fault set.

13. The network device of claim 10, wherein the reduced set generator identifies the reduced fault set through the elimination of the second fault set through the use of a set operation.

14. The network device of claim 13, wherein the set operation includes at least one of a join operation, a set difference operation, a Cartesian product operation, a union operation or an intersection operation.

15. The network device of claim 10, wherein the reduced set generator identifies a reduced fault set that is a combination of the first fault set and the second fault set, when the member of the first fault set and the member of the second fault set are distinct.

16. The network device of claim 10, wherein the source node and the destination node are within a network domain.

17. The network device of claim 16, wherein the network domain is a network that includes at least one of a layer 1, or layer 2 based network.

18. The network device of claim 10, wherein the reduced set generator uses at least one of a recursive method or an iterative method.

19. A network device comprising:
at least one processor; and
a memory in communication with the at least one processor, the memory including logic encoded in one or more tangible media for execution and when executed operable to:
identify at least one fault identifier to be a member of a first fault set, and identifying at least one fault identifier to be a member of a second fault set, the first fault set associated with a first path from a source node to a destination node, and the second fault set associated with a second path from the source node to the destination node; and
identify a reduced fault set by eliminating the second fault set, when the first fault set is a subset of the second fault set.

20. An apparatus comprising:
means for identifying at least one fault identifier to be a member of a first fault set, and identifying at least one fault identifier to be a member of a second fault set, the first fault set associated with a first path from a source node to a destination node, and the second fault set associated with a second path from the source node to the destination node; and
means for identifying a reduced fault set by eliminating the second fault set, when the first fault set is a subset of the second fault set.

21. A computer-readable medium having stored thereon instructions which, when executed by a computer, cause the computer to:
identify at least one fault identifier to be a member of a first fault set, and identifying at least one fault identifier to be a member of a second fault set, the first fault set associated with a first path from a source node to a destination node, and the second fault set associated with a second path from the source node to the destination node; and
identify a reduced fault set by eliminating the second fault set, when the first fault set is a subset of the second fault set.

* * * * *

UNITED STATES PATENT AND TRADEMARK OFFICE
CERTIFICATE OF CORRECTION

PATENT NO. : 7,808,888 B2  Page 1 of 1
APPLICATION NO. : 12/036653
DATED : October 5, 2010
INVENTOR(S) : Danny Kibel et al.

It is certified that error appears in the above-identified patent and that said Letters Patent is hereby corrected as shown below:

On the Title page, item (75), in "Inventors", in column 1, line 1, delete "Varbug" and insert -- Warburg --, therefor.

On the Title page, item (75), in "Inventors", in column 1, line 4, delete "Bazra" and insert -- Batzra --, therefor.

Signed and Sealed this

Thirtieth Day of November, 2010

David J. Kappos
*Director of the United States Patent and Trademark Office*